Dec. 6, 1949     E. J. CARLETON     2,490,510
UNLOADING VALVE
Filed July 12, 1945
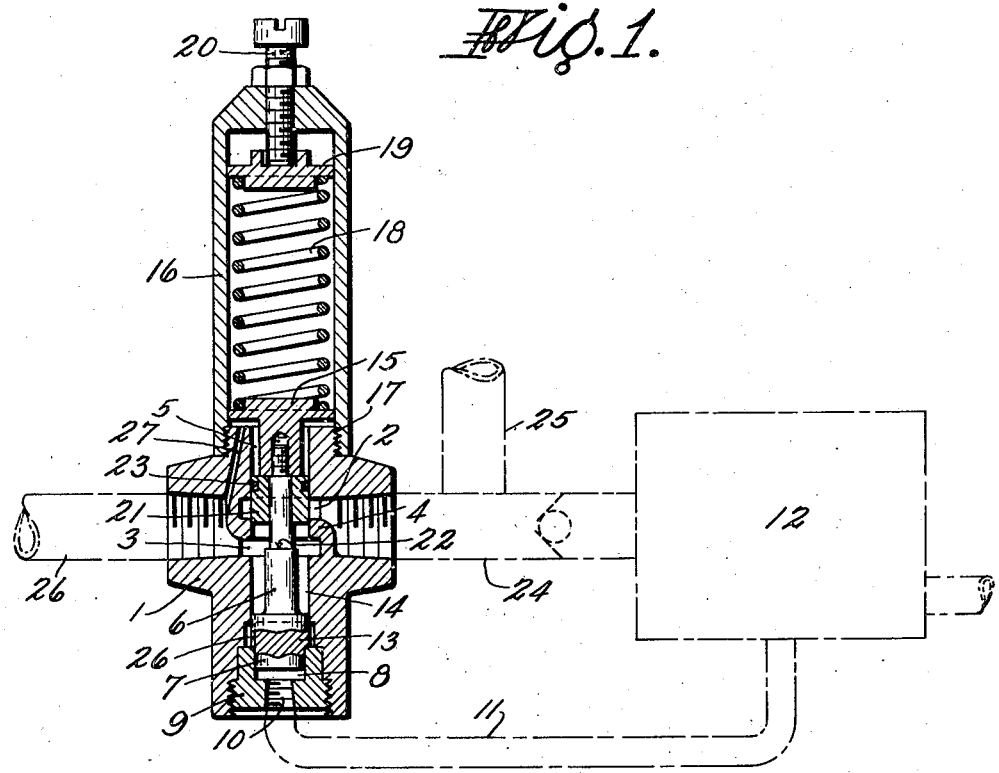
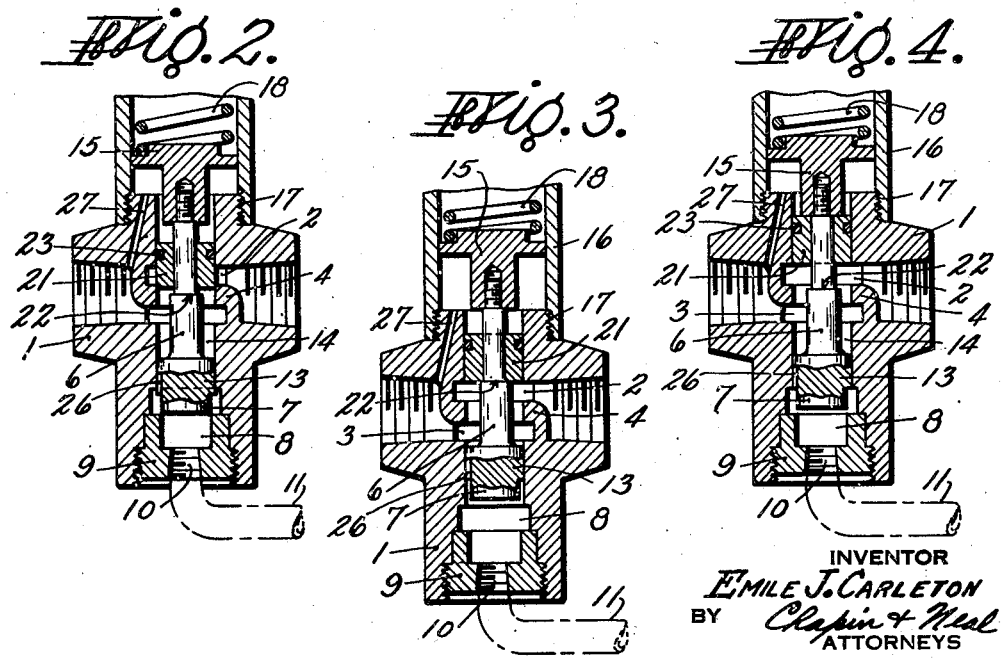
INVENTOR
EMILE J. CARLETON
BY Chapin & Neal
ATTORNEYS Patented Dec. 6, 1949

2,490,510

UNITED STATES PATENT OFFICE 2,490,510

UNLOADING VALVE

Emile J. Carleton, Holyoke, Mass., assignor to Hydraulic Engineering Co. Inc., Holyoke, Mass., a corporation of Massachusetts Application July 12, 1945, Serial No. 604,620

3 Claims. (Cl. 137—153)

This invention relates to an improved unloading valve having a special utility for unloading the pump supplying the accumulator in hydraulic systems, more particularly where a heavy liquid such as oil is used.

Difficulty has heretofore been encountered in the operation of unloading valves in such system in that when the valve has opened in response to an increase in pressure of the liquid in the accumulator it does not properly close when the accumulator pressure drops. With the valve constructions heretofore used there is a tendency once the valve is opened for the pressures on the operating mechanisms to find a balance which leaves the unloading valve partly open.

It is the principal object of the present invention to provide a pressure controlled unloading valve for hydraulic operation which will close completely on a predetermined reduction of the pressure of the fluid in the accumulator.

In the accompanying drawing which illustrates one embodiment of my invention;

Fig. 1 is a longitudinal section, the piping connections being shown in dotted lines, the valve being shown closed; and Figs. 2, 3, and 4 are similar but fragmentary views showing successive steps in the operation of the valve.

Referring to the drawings 1 designates the body of the valve casing which is separated into inlet and outlet chambers 2 and 3 respectively by a transverse partition 4. The casing is formed with a longitudinal bore 5 which extends through the partition and opens at both ends of the casing. An actuating member or plunger 6 is reciprocably mounted in the bore. One end of the actuating member is formed with a piston head 7 which operates in a cylinder 8 formed in a member 9 threaded into the end of the valve casing, the outer end of the cylinder 8 being provided with an opening 10 which is adapted to be connected, as shown in dotted lines at 11, with the accumulator 12. Above the cylinder 8 the cross sectioned area of the piston is enlarged as at 13 and the enlarged portion of the piston operates in an enlarged portion 14 of the cylinder.

The upper end of the plunger 6 is threaded into a head piece 15 which extends outwardly of the body of the valve casing 1. A hollow cylindrical cap 16 is threaded at 17 to the casing 1. A spring 18 is positioned between head piece 15 and a plate 19 sliding in cap 16, the position of plate 19, and therefore the pressure exerted by spring 18 on the plunger, being made adjustable by an abutment screw 20 threaded through the closed end of cap 16.

A cylindrical valve member 21 is mounted on the plunger for slidable movement thereon between the head piece 15 and a shoulder 22 formed on the plunger. The valve member 21 is provided with a friction ring 23 which engages the wall of the bore 5 and tends to hold the valve member stationary during the lost motion movement of the plunger as later described.

Chamber 2 is adapted to be connected as by pipes 24 and 25 (shown in dotted line in Fig. 1) to the pressure or discharge side of a pump (not shown) which supplies liquid under pressure to the accumulator, and chamber 3 is adapted to be connected to the inlet side of the pump as by a pipe 26. With the parts in the position shown in Fig. 1 the valve member 21 closes the passage between chambers 2 and 3 and plunger 6 is in its lowermost position with the piston 7 in cylinder 8.

If for any reason pressure builds up in the accumulator beyond a predetermined point the pressure exerted on the piston 7 through connection 11 moves the actuating plunger 6 against the action of spring 18, the valve member 21 remaining in closed position, as shown in Fig. 2, in which Figure the piston 7 has risen until it is about to leave cylinder 8 and shoulder 22, forming one extreme of the lost motion connection between the actuator and the valve member, is just short of engagement with the valve member 21. The stroke of the small diameter portion 7 of the piston in the small diameter portion 8 of the cylinder is substantially equal to the extent of lost motion travel of the plunger so that upon continued movement of the plunger, piston 7 leaves the cylinder 8 and the area exposed to the pressure is increased as the pressure acts on the enlarged portion 13 of the piston. Substantially as this occurs the shoulder 22 engages valve member 21 and the sudden increase of power, due to the enlarged piston area being acted on by the pressure in the accumulator, carries the valve member 21 to the open position, shown in Fig. 3, against the pressure of spring 18. The pump is thus short circuited through the valve chambers 2 and 3. When the pressure in the accumulator drops with a consequent decrease of pressure on the piston 7—13 spring 18 forces the plunger downwardly, the valve member remaining in open position until the plunger reaches the position of Fig. 4 where piston 7 is about to re-enter cylinder 8 and head piece 15 which forms the other extreme of the lost motion connection is just short of engagement with the valve member. As the portion 7 enters cylinder portion 8 head piece 15 engages the valve member 21 and the sudden decrease in power due to the reduction of the effective area of the piston exposed to the accumulator pressure now favoring spring 18, the latter carries the valve member to the closed position of Fig. 1. Entrapment of liquid between the enlarged portion 13 of the piston and member 3 is prevented by one or more small relief grooves 26 formed in the piston. Also a passage 27 in casing 1 connects the space above the valve member 21 to the low pressure chamber 3 assuring that no pressure builds up above the valve member.

It will be seen that by arrangement above described the valve member is not permitted a gradual movement to a throttling position in which a balance of pressures can occur. The hunting movement of the actuator takes place as idle movement of the actuator within the limits of the lost motion connection. A positive and reliable unloading valve for hydraulic operation is thereby secured.

I claim:

1. In an unloading valve which includes a casing having two chambers adapted to be connected to the pressure side of a pump supplying a source of accumulating pressure and to the intake side of the pump respectively, a passage between the chambers and a valve member movable to and from positions to open and close said passage, an actuating member mounted in the casing and having a lost motion connection with the valve member, loading means acting on one end of the actuating member to move said actuating member in a direction to shift the valve member to closed position approximately at one extreme of its lost motion connection with the actuating member, a third chamber in said casing adapted to be connected to said source of accumulating pressure, means carried by the other end of the actuating member and responsive to the pressure in the third chamber to move the actuating member in a direction to shift the valve member to open position approximately at the other extreme of its lost motion connection with the actuating member and means acting at the said approximate extremes of the lost motion connection to respectively decrease and increase the effective force of the pressure in the third chamber acting on said actuating member at the initiation of the valve shifting portions of the movements of the actuator.

2. In an unloading valve which includes a casing having two chambers adapted to be connected to the pressure side of a pump supplying a source of accumulating pressure and to the intake side of the pump respectively, a passage between said chambers and a valve member movable to and from positions to open and close said passage, an actuating member mounted in the casing and having a lost motion connection with the valve member, a spring acting on one end of the actuating member to move said actuating member in a direction to shift the valve member to closed position approximately at one extreme of its lost motion connection with the actuating member, a piston carried by the other end of the actuating member, an opening in the casing adapted to be connected to said source of accumulating pressure and expose said piston to the pressure therein to move the actuating member in a direction to shift the valve member to open position approximately at the other extreme of its lost motion connection with the actuating member, and means acting at the said approximate extremes of the lost motion connection to respectively decrease and increase the effective area of the piston exposed to the pressure in said source of accumulating pressure, at the initiation of the valve shifting portions of the movements of the actuating means.

3. In an unloading valve which includes a casing having two chambers adapted to be connected to the pressure side of a pump supplying a source of accumulating pressure and to the intake side of the pump respectively, a passage between said chambers and a valve member movable to and from positions to open and close said passage, a plunger mounted in the casing and extending slidably through said valve member, a head on said plunger engageable with one side of the valve member and a shoulder formed on the plunger engageable with the other side of the valve member, said head and shoulder being spaced to form a lost motion connection between the valve member and the plunger, a spring acting on said head to move the plunger in a direction to shift the valve member from open to closed position upon engagement of the head with the valve member, a third chamber in said casing adapted to be connected to said source of accumulating pressure, a cylinder formed in the casing and opening to said third chamber, a piston carried by the other end of the plunger and operating in said cylinder, said piston and cylinder having outer and inner portions of small and large diameter respectively, said piston acting in response to a pressure in the third chamber in excess of the spring pressure to move the plunger in a direction to shift the valve member from closed to open position upon engagement of said shoulder with the valve member, the stroke of the small diameter portion of the piston in the small diameter portion of the cylinder being substantially coextensive with the extent of lost motion travel of the plunger.

EMILE J. CARLETON.

REFERENCES CITED

The following references are of record in the file of this patent:

UNITED STATES PATENTS

| Number | Name | Date |
|---|---|---|
| 1,808,431 | Osborne | Oct. 18, 1928 |
| 2,372,016 | Rockwell | Sept. 19, 1942 |